Nov. 10, 1953    F. H. ROBERTSON    2,658,701
FLYING CONTROL FOR AIRCRAFT
Filed Oct. 12, 1949    2 Sheets-Sheet 1
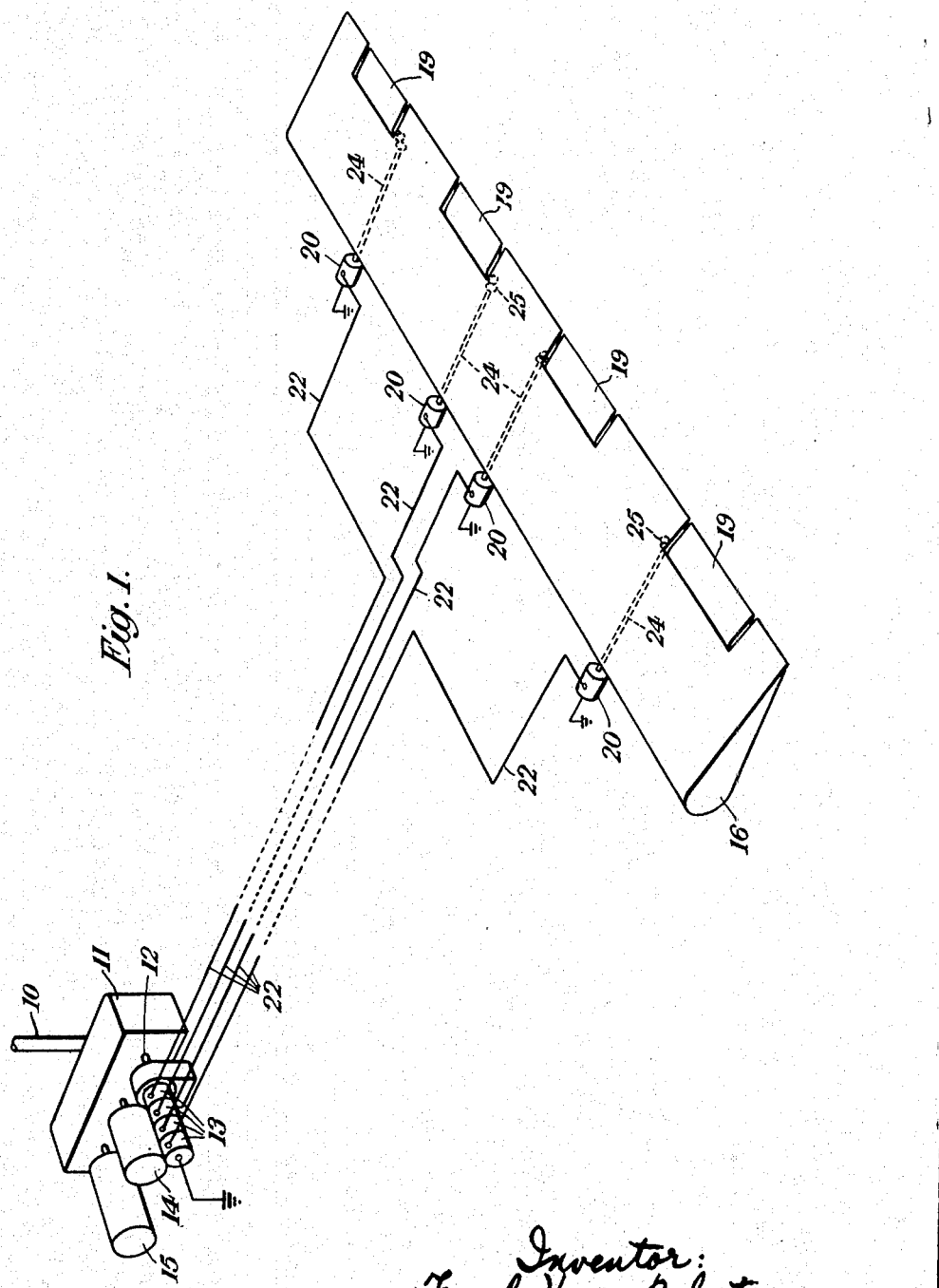

Nov. 10, 1953 F. H. ROBERTSON 2,658,701
FLYING CONTROL FOR AIRCRAFT
Filed Oct. 12, 1949 2 Sheets-Sheet 2
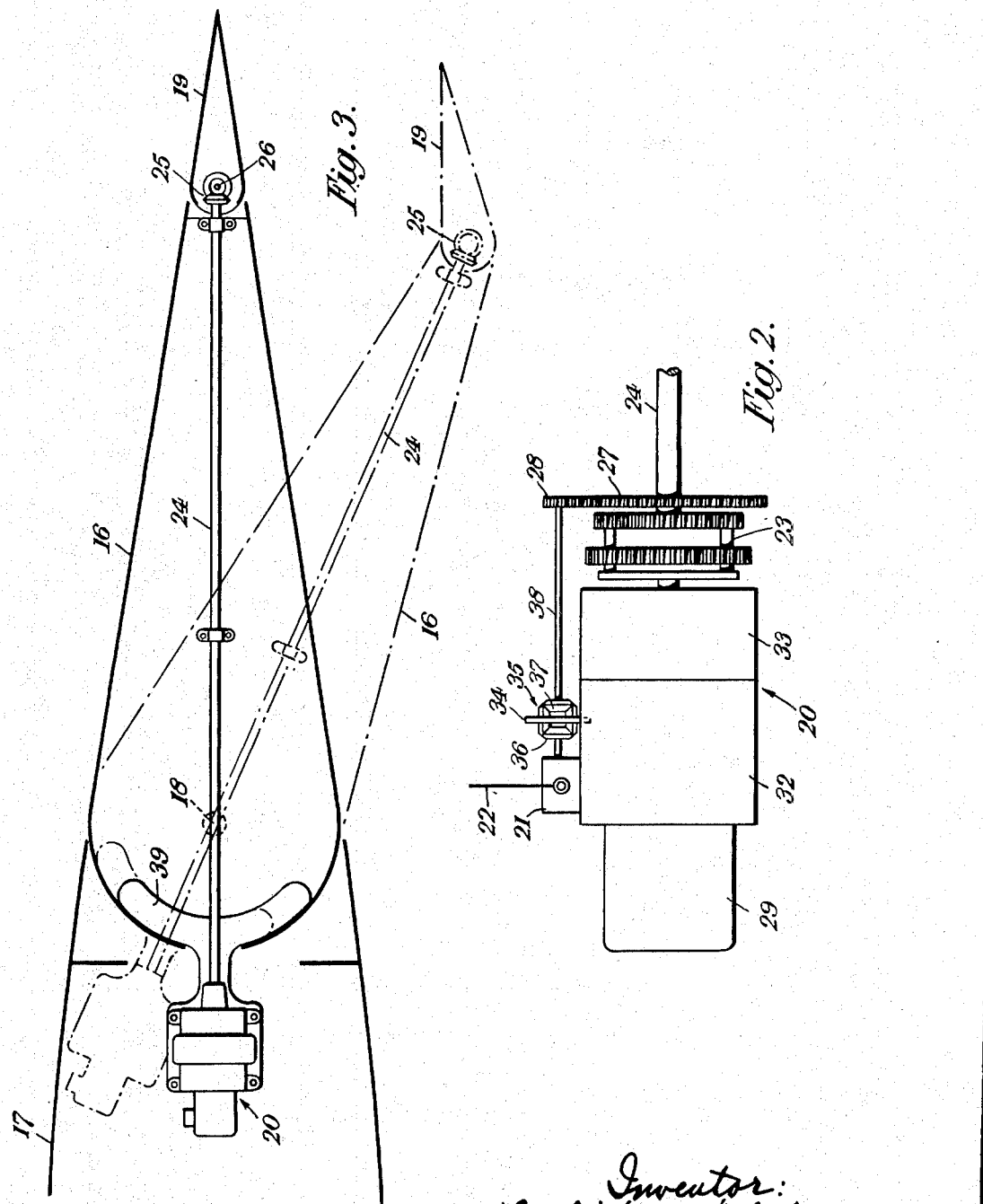
Inventor:
Frank Henry Robertson Patented Nov. 10, 1953

2,658,701

UNITED STATES PATENT OFFICE 2,658,701

FLYING CONTROL FOR AIRCRAFT

Frank Henry Robertson, Carisbrooke, Isle of Wight, assignor to Saunders-Roe Limited, Isle-of-Wight, England, a British company Application October 12, 1949, Serial No. 120,917

5 Claims. (Cl. 244—82)

In modern large and/or high speed aircraft, the aerodynamic loads on the control surfaces (i. e. the elevator, rudder, ailerons) are such that the pilot, with his own unaided strength, is often unable to exert sufficient force to move the control surfaces manually or to hold them against the applied loads.

To meet this difficulty, two alternative solutions have been proposed. The first is the use of power operation for the control surfaces. The mechanisms involved are, however, complicated and expensive, and there is always the danger of failure, with the result that duplication of the power units is advisable, as described for example in United States Patent 2,517,680 and in United States application Serial No. 92,794/49. The second is the use of servo tabs. In this system a mechanical connection is provided from the pilot's control member not to the control surface itself, but to a tab hinged to the trailing edge of the control surface, the tab being arranged to move in relation to the control surface, on operation of the control member, in the direction opposite to that in which the control surface is to move in relation to the aircraft, with the result that the aerodynamic load on the tab, when displaced, serves to move the control surface to the desired position. Thus, in the case of an elevator, when it is desired to depress the elevator the tab is raised, and when it is desired to raise the elevator the tab is depressed. Where servo tabs are used the control surface must be mass balanced, both to hold it in adjusted position and to prevent flutter, with the result that the weight of the mechanism required to operate the control surface will exceed that involved by the use of a properly designed power control installation with which, if irreversible operators are included, mass balancing is unnecessary.

The invention makes use of the advantageous features of both of the above described systems and provides, in an aircraft, the combination, with a control surface fitted with a servo tab, of a variable speed power unit mounted on the control surface, so as to constitute a part at least of the mass balance thereof, operatively connected to the servo tab and operable by the pilot's control member to displace the servo tab to a position in relation to the control surface determined by the position of the pilot's control member, and at a rate corresponding to the rate of movement of the pilot's control member.

Power operated flying control systems, in general, can be made lighter than manual flying control systems. The system according to the invention provides further saving in weight.

Since the power unit only has to move the servo-tab relatively to the control surface, it may be made considerably smaller and lighter than is possible when the power unit has to develop the greater power required to effect direct displacement of the control surface in relation to the aircraft structure. A further saving in weight results from the fact that the power unit constitutes part, and may in some cases constitute the whole, of the mass balance required for the control surface.

The saving in weight which can be achieved by the invention is illustrated by the following example, which provides an approximate comparison of the relative weights of three forms of mechanism required to operate the control surfaces of a given large aircraft:

(a)

| | Pounds |
|---|---|
| Power control system operating directly on the surfaces as described in United States Patent No. 2,517,680 | 1800 |

(b)

| | Pounds |
|---|---|
| Mechanical linkage for operating servo tabs | 1700 |
| Mass balance | 900 |
| | 2600 |

(c) Mechanism according to the invention

| | Pounds |
|---|---|
| Electrical linkage for operating the power units | 500 |
| Small power units for operating the servo tabs | 300 |
| Mass balance | 600 |
| | 1400 |

This example shows that the power control system of United States Patent No. 2,517,680 is considerably lighter than a comparable system embodying mechanical operation of servo tabs, and that the system according to the invention, in which power units, constituting part of the mass balances of the control surfaces, operate the servo tabs, produces a further reduction in weight.

Another advantage of the system according to the invention is greater safety. Having regard to the fact that the control surfaces are not irreversible, as in normal powered controls, other outside agencies may be employed as safety devices to move the control surface in the event of failure of the power system. Moreover, even if no such emergency safety devices are provided, the control surface is free to float to a neutral and relatively safe position under the aerodynamic loads in the event of power failure.

Furthermore, as a safeguard against failure of the power unit, the control surface may be provided with a plurality of power units, the tab being split into sections each operated by one of the power units and the power units being operated in synchronism by the pilot's control member, as described in United States application Serial No. 92,794/49. Then, notwithstanding failure of one of the power units, the pilot will be able to maintain sufficient control over the position of the control surface with the aid of the others.

In the case of large aircraft, the power unit will normally be operated from the pilot's control member by a master and slave unit, comprising a transmitter connected to the pilot's control member and a remote receiver located adjacent the power unit and serving to follow the movement imparted to the transmitter by the pilot's control member. An appropriate form of master and slave unit is an electrical unit of the Selsyn type.

Preferably the power unit is constituted by a continuously running electric motor, a variable delivery hydraulic pump driven by the electric motor, and a hydraulic motor driven by the pump and arranged to actuate the tab, the pilot's control member serving to vary the delivery of the pump and a follow-up gear being provided for returning the pump delivery to zero when the tab has executed the desired movement. Other forms of variable speed power unit may, however, be used if desired.

A preferred flying control system according to the invention will now be described in detail, by way of example, with reference to its application to the control of an elevator, but it will be understood that an exactly similar system may be used in conjunction with any or all of the other control surfaces, i. e. the rudder or ailerons.

The preferred system in question is shown in the accompanying drawings, in which:

Fig. 1 is a diagrammatic layout of the complete system insofar as it relates to the elevator, Fig. 2 is a plan view of one of the power units and associated receiver and gearing, and Fig. 3 is a diagrammatic section through the elevator showing the power unit and the mechanism whereby it actuates the servo tab.

The pilot's control column 10 (Fig. 1) is fixed to a shaft in a gear box 11 so that fore and aft movement of the control column 10 will rotate the shaft. As fully described in United States application Serial No. 92,794/49, the shaft fixed to the control column 10 is geared to a shaft 12 for operating four Selsyn transmitters 13, so that the actuating member of each transmitter receives a movement corresponding in magnitude and direction to that of the control column 10. Associated with the gear box 11, and as fully described in United States application Serial No. 92,794/49, are the servomotor 14 of an automatic pilot and a feel generator 15.

The elevator 16 (see also Fig. 3) is freely hinged to a tail plane 17 for movement about an axis 18 and carries a servo tab 19 divided into four sections. Each section of the servo tab 19 is operated by a power unit 20, which is in turn actuated by a Selsyn receiver 21, each receiver 21 being electrically connected by a cable 22 to the associated transmitter 13.

Each power unit 20 comprises a constant speed electric motor 29 (Fig. 2) which runs continuously to drive a variable delivery hydraulic pump 32; this pump 32 drives a hydraulic motor 33, and this in its turn operates one of the sections 19 of the servo tab. The hydraulic pump 32 is of the swashplate type and its delivery mechanism is controlled by the planet carrier 34 of a differential gear 35, one sun wheel 36 of which is driven by the associated receiver 21 and the other sun wheel 37 of which is driven by a feed-back shaft 38 from the output side of the hydraulic motor 33, the shaft 38 and sun wheel 37 constituting a follow-up mechanism.

Normally, when the elevator is stationary, there is no delivery from the pump 32 and the hydraulic motor 33 is, of course, stationary. As soon as the control column 10 is moved the receiver 21 is caused to execute a corresponding movement and turns the first sun wheel 36. Since the follow-up mechanism, and thus the second sun-wheel 37, are stationary the effect is to turn the planet-carrier 34 and thus to move a lever (not shown) to start delivery in the appropriate direction from the pump. This causes the hydraulic motor to start and to drive, at a speed determined by the rate of movement of the control column 10, the associated section 19 of the servo tab through a reduction gearing 23, a shaft 24 and bevel gearing 25. The section 19 of the servo tab is hinged to the elevator on an axis 26. The shaft 24 drives the feed back shaft 38 through gears 27, 28 thus causing the second sun-wheel 37 of the differential gear to rotate. Since the first sun-wheel 36 is now stationary, the effect is again to rotate the planet-carrier 34, the gearing of the follow-up mechanism being such as to make the rotation opposite to its original direction. The delivery of the pump is gradually reduced and, when movement of the tab section 19 corresponding to that of the control column 10 has been produced, the delivery is stopped and movement ceases.

The power unit 20 is mounted on a bracket 39 (Fig. 3) fixed to the elevator 16 on the side of the hinge axis 18 remote from the body of the elevator. It therefore constitutes part, at least, of the mass balance required for the elevator. As indicated in chain dotted lines in Fig. 3, when the servo tab 19 is raised in relation to the elevator 16, the latter is depressed in relation to the tail plane 17 by the aerodynamic forces acting on the servo tab, the elevator assuming a position determined by the displacement of the servo tab from the neutral position shown in full lines. Similarly, if the servo tab is depressed, the elevator will be raised in relation to the tail plane to a position determined by the displacement of the servo tab.

What I claim as my invention and desire to secure by Letters Patent is:

1. In an aircraft, the combination of a control surface, a servo tab hinged to the trailing edge of said control surface, a pilot's control member operative on said servo tab only, to the exclusion of said control surface itself, to initiate movement of said control surface, a variable speed power unit mounted on said control surface and constituting, in part at least, a mass balance therefor, an operative connection between said power unit and said servo tab, a connection between said pilot's control member and said power unit for rendering said power unit operative, whenever the pilot's control member is moved, to displace said servo tab to a position and at a rate determined respectively by the amplitude and rate of movement of the pilot's control member, and thereby to impart corresponding movement to the control surface, and means for terminating operation of said power unit on arrival of the servo tab at a position in relation to the control surface selected by the movement of the pilot's control member.

2. In an aircraft, the combination of a control surface, a servo tab hinged to the trailing edge of said control surface, a pilot's control member operative on said servo tab only, to the exclusion of said control surface itself, to initiate movement of said control surface, a variable speed power unit mounted on said control surface and constituting, in part at least, a mass balance therefor, an operative connection between said power unit and said servo tab, a master and slave unit comprising a transmitter connected to said pilot's control member and a remote receiver connected to said power unit and serving to follow the movement imparted by the pilot's control member to the transmitter, said master and slave unit serving to render said power unit operative, whenever the pilot's control member is moved, to displace said servo tab to a position and at a rate determined respectively by the amplitude and rate of movement of the pilot's control member, and thereby to impart corresponding movement to the control surface, and means for terminating operation of said power unit on arrival of the servo tab at a position in relation to the control surface selected by the movement of the pilot's control member.

3. In an aircraft, the combination of a control surface, a servo tab hinged to the trailing edge of said control surface, a pilot's control member operative on said servo tab only, to the exclusion of said control surface itself, to initiate movement of said control surface, a variable speed power unit mounted on said control surface and constituting, in part at least, a mass balance therefor, an operative connection between said power unit and said servo tab, an electrical master and slave unit comprising a transmitter connected to said pilot's control member, a remote receiver connected to said power unit and an electric cable connecting said transmitter and receiver, said receiver being adapted to follow the movement imparted by the pilot's control member to the transmitter, and said master and slave unit serving to render said power unit operative, whenever the pilot's control member is moved, to displace said servo tab to a position and at a rate determined respectively by the amplitude and rate of movement of the pilot's control member, and thereby to impart corresponding movement to the control surface, and means for terminating operation of said power unit on arrival of the servo tab at a position in relation to the control surface selected by the movement of the pilot's control member.

4. In an aircraft, a combination as claimed in claim 1, wherein said power unit comprises a constantly running electric motor, a hydraulic pump, having a variable and reversible delivery, driven by the electric motor, a hydraulic motor driven by the hydraulic pump and serving to operate the servo tab, the pump being adjustable by the pilot's control member to drive the hydraulic motor in a direction and at a speed corresponding to the direction and speed of movement of the pilot's control member, and a follow-up gear between the output side of the hydraulic motor and the pump for terminating the delivery of the pump when the servo tab has assumed the position selected by the pilot's control member.

5. In an aircraft, the combination of a control surface, a plurality of independently movable servo tabs hinged to the trailing edge of said control surface, a pilot's control member operative on said servo tabs only, to the exclusion of said control surface itself, to impart movement to said control surface, a plurality of variable speed power units mounted on said control surface and constituting, in part at least, a mass balance therefor, each of said power units being connected to one of said servo tabs, connections between said pilot's control member and said power units for rendering said power units operative in synchronism, whenever the pilot's control member is moved, to displace said servo tabs to a position and at a rate determined respectively by the amplitude and rate of movement of the pilot's control member, and thereby to impart corresponding movement to the control surface, and means for terminating operation of said power units on arrival of the servo tabs at a position in relation to the control surface selected by the movement of the pilot's control member.

FRANK HENRY ROBERTSON.

References Cited in the file of this patent

UNITED STATES PATENTS

| Number | Name | Date |
| --- | --- | --- |
| 1,827,304 | Thurston | Oct. 13, 1931 |
| 2,057,877 | Bragunier | Oct. 20, 1936 |
| 2,325,548 | Roos et al. | July 27, 1943 |
| 2,340,524 | Fischel et al. | Feb. 1, 1944 |
| 2,371,388 | Glenny | Mar. 13, 1945 |
| 2,470,968 | Aske | May 24, 1949 |
| 2,517,680 | Knowler et al. | Aug. 8, 1950 |
| 2,601,962 | Douglas | July 1, 1952 |

FOREIGN PATENTS

| Number | Country | Date |
| --- | --- | --- |
| 572,494 | Great Britain | Oct. 10, 1945 |
| 627,858 | Great Britain | Aug. 17, 1949 |

OTHER REFERENCES

"Aviation Week," published weekly by McGraw-Hill Publishing Co., 99–129 N. Broadway, Albany 1, N. Y.; Sept. 12, 1949; pages 23 to 30 and 33, page 30 relied on.